Oct. 29, 1929.     R. C. GRASEBY     1,733,872
ELECTRIC MOTOR
Filed Jan. 20, 1928     2 Sheets-Sheet 1
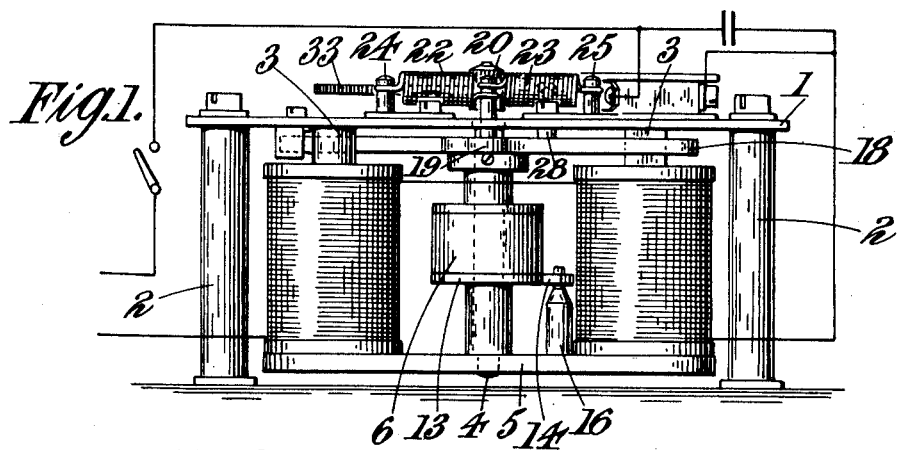
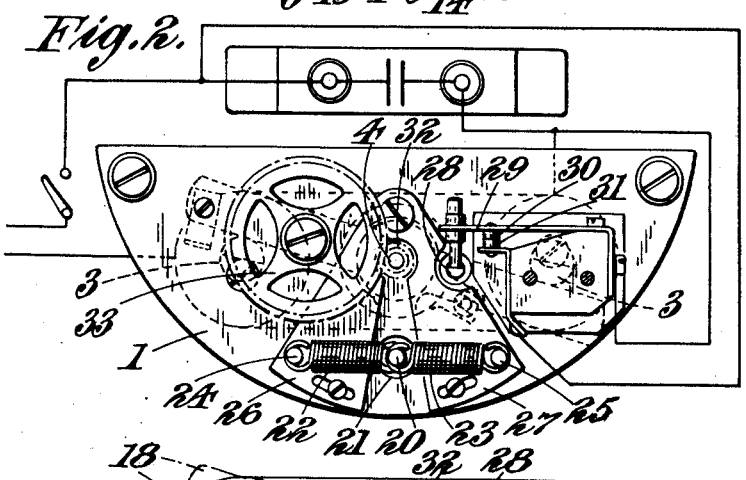
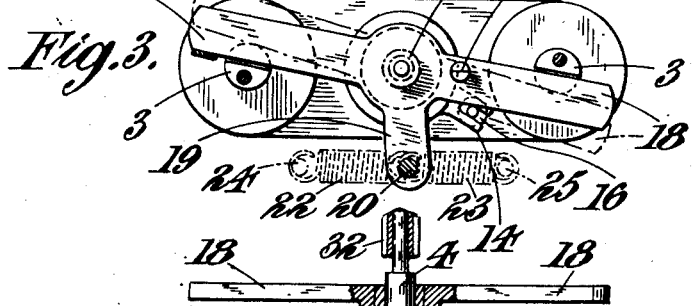
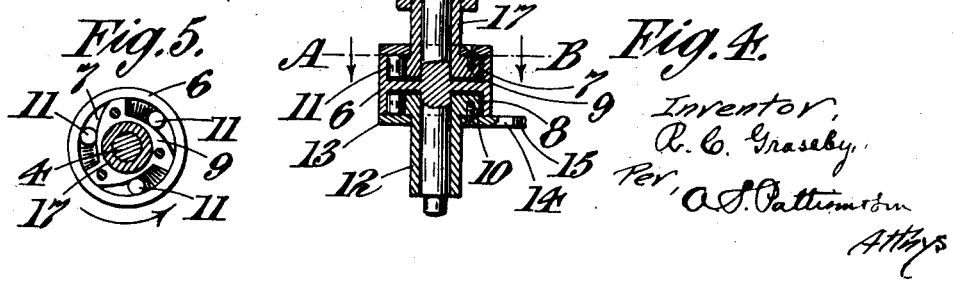
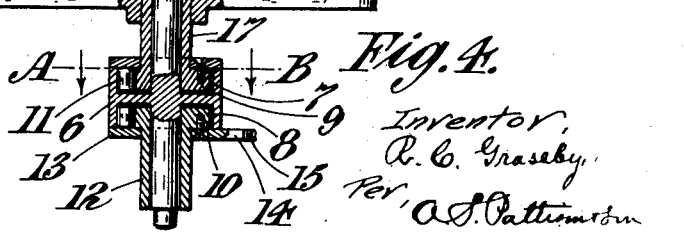

Oct. 29, 1929.   R. C. GRASEBY   1,733,872
ELECTRIC MOTOR
Filed Jan. 20, 1928   2 Sheets-Sheet 2
Fig. 6
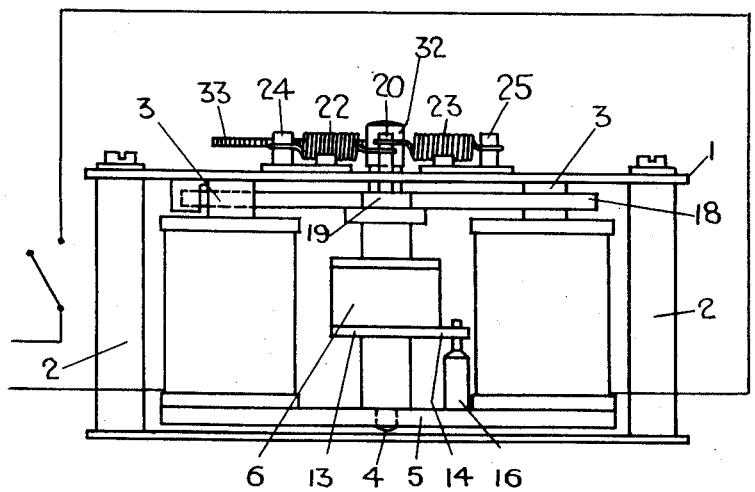
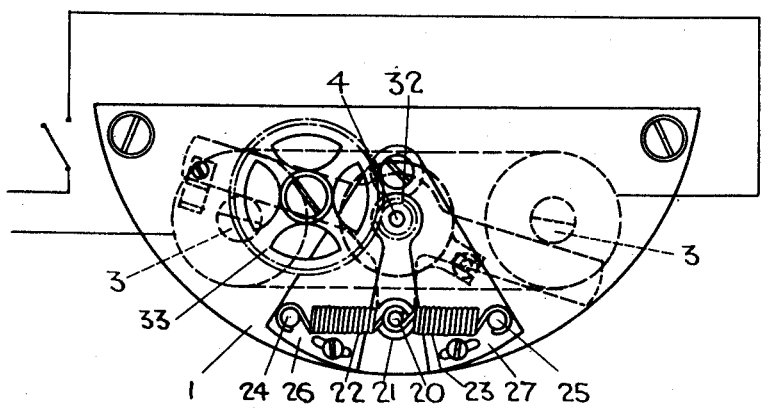
Fig. 7

Patented Oct. 29, 1929

1,733,872

UNITED STATES PATENT OFFICE

ROBERT CONSTANTINE GRASEBY, OF WESTMINSTER, LONDON, ENGLAND

ELECTRIC MOTOR

Application filed January 20, 1928, Serial No. 248,170, and in Great Britain March 19, 1927.

This invention relates to electric motors and more particularly to electric motors of high torque, slow speed and more power in combination with an electro-magnet for the purpose of operating a train of gears.

The primary object of the invention is the provision of a device of the character described in which is incorporated the novel features of construction and which brings about improved results, the advantages and novelties of the invention being pointed out more specifically hereinafter.

One form of electric motor and its associated mechanism illustrating the present invention for use with direct current will now be described, by way of example, with reference to the accompanying drawings wherein:

Fig. 1 shows an elevation,

Fig. 2 a plan,

Fig. 3 a plan of the electro-magnet and armature,

Fig. 4 a section of the spindle of the motor,

Fig. 5 a section on the line A—B of Fig. 4,

Fig. 6 is a view in elevation of a modified form of the invention, and

Fig. 7 is a plan view of the apparatus appearing in Fig. 6.

A brass or other non-magnetic plate 1 is mounted on pillars 2, 2, and under it is suspended an electro-magnet secured by its poles 3, 3. A spindle 4 mounted midway between the poles 3, 3, has a bearing at one end in the brass plate 1 and at the other end in the yoke 5 of the electro-magnet. Said spindle has mounted between its ends a member 6 having cylindrical recesses 7, 8, in opposite faces. In the recesses are accommodated respectively clutch members 9, 10, for example, of the known form shown in Fig. 5, in which in one direction of rotation of the member 9 shown in said figure balls 11 are gripped between surfaces of the member 9 and the inner surface of the member 6. The lower clutch member 10 is mounted on a sleeve 12 surrounding the spindle 4. The recess 8 is closed by a plate 13 secured to the member 10 and having an extension 14 with a slot 15 at its outer end which is engaged by a pin 16 carried on the yoke 5 of the electro-magnet. The upper clutch member 9 is carried on a sleeve 17 surrounding the spindle 4 and carrying at its upper end an armature 18. The armature is of substantially oblong form and a length to extend slightly beyond the poles of the electro-magnet and is so arranged that in one direction its ends swing towards the poles of the electro-magnet and in the other direction away therefrom. Said armature has an arm 19 extending from its middle carrying a pin 20 which projects upwards through a hole 21 in the plate 1. The pin is attached by spiral springs 22, 23 extending on opposite sides to pins 24, 25 respectively carried on plates 26, 27 adjustable on the plate 1 for the purpose of varying the tension of the springs. A pin 28 is also mounted on the armature and is arranged to contact with the end of a spring 29 carrying a contact 30 which with a co-operating contact 31 is connected in the circuit of the electro-magnet. The arrangement is such that towards the end of the movement of the armature to the poles of the electro-magnet the contacts 30, 31 are opened and as the armature moves in the other direction said contacts are closed by the action of the spring 29 and also that the movement of the armature in one direction is in opposition to the spring and in the other direction is free of the spring. The contact making and breaking means may be separate from the armature of the motor and may be operated by the attraction of a second armature to the pole of the electro-magnet.

Attention is called to the fact that small departures and changes in the mechanism illustrated can be made without departing from the spirit of the invention as for instance the arm 19 may be dispensed with and in that event the pin 20 would be mounted directly on the armature.

In operation the natural period of oscillation of the armature 18 depends upon the tension of the springs 22, 23 and it is also affected by the spring 29, to compensate for which the tension of one of the springs 22 or 23 is adjusted. The armature oscillates in its natural period towards and away from the poles of the electro-magnet and during such oscillation causes the contacts 30, 31 to open and close whereby the electro-magnet is de-energized and energized at a frequency or the natural period of oscillation of the armature system. The movement of the armature is communicated through the clutch member 9 to the member 6 and thus to the spindle 4. During the backward movement of the clutch member 9 the member 6 is held stationary by the clutch member 10. There is thus produced a rotation of the spindle 4 which is communicated through a pinion 32. Said pinion is shown meshing with a pinion 33 which is the first of a gear train of mechanism with which the motor is to be used.

Figs. 6 and 7 illustrate an electric motor for use with alternating current. The construction is exactly as illustrated in Figs. 1 to 5 and the parts bear the same references as in said figures. The pin 28 and the spring contacts 30 and 31 of Figs. 1 and 2 are however omitted in Figs. 6 and 7. The tensions of the springs 22 and 23 are so adjusted that the natural period of oscillation of the armature system is equal to or an harmonic of the frequency of the alternating current supply.

It will be understood that two separate clutches may be employed instead of the double clutch described above. Instead of the two spiral springs 22, 23. a single flat spring may be employed to act on the armature.

What I claim is:—

1. An electric motor comprising in combination an electro-magnet, a spindle mounted between the poles thereof, a member having cylindrical recesses in opposite faces, on the spindle, a sleeve on said spindle, an armature mounted at one end of said sleeve to swing in one direction with its ends towards the poles of the electro-magnet and in the other direction away therefrom, a clutch member mounted at the other end of the sleeve and accommodated in one of the recesses to grip the spindle and rotate it when the armature moves in one direction, a second and fixed clutch member accommodated in the other recess adapted to grip the spindle to prevent its rotation in the opposite direction and spring means to control the oscillation of the armature system.

2. An electric motor comprising in combination an electro-magnet, a spindle mounted between the poles thereof, a member having cylindrical recesses in opposite faces mounted on the spindle, a sleeve on said spindle, an armature mounted at one end of said sleeve to swing in one direction with its ends towards the poles of the electro-magnet and in the other direction away therefrom, a clutch member mounted at the other end of the sleeve and accommodated in one of the recesses to grip the spindle and rotate it when the armature moves in one direction, a second and fixed clutch member accommodated in the other recess adapted to grip the spindle to prevent its rotation in the opposite direction, spring means to control the oscillation of the armature system and contact making and breaking means connected in the electro-magnet circuit.

3. An electric motor comprising in combination an electro-magnet, a spindle mounted between the poles thereof, a member having cylindrical recesses in opposite faces mounted on the spindle, a sleeve on said spindle, an armature mounted at one end of said sleeve to swing in one direction with its ends towards the poles of the electro-magnet and in the other direction away therefrom, a clutch member mounted at the other end of the sleeve and accommodated in one of the recesses to grip the spindle and rotate it when the armature moves in one direction, a second and fixed clutch member accommodated in the other recess adapted to grip the spindle to prevent its rotation in the opposite direction, spring means to control the oscillation of the armature system, and means to vary the tension of the spring means.

4. An electric motor comprising in combination an electro-magnet, a spindle mounted between the poles thereof, a member having cylindrical recesses in opposite faces mounted on the spindle, a sleeve on said spindle, an armature mounted at one end of said sleeve to swing in one direction with its ends towards the poles of the electro-magnet and in the other direction away therefrom, a clutch member mounted at the other end of the sleeve and accommodated in one of the recesses to grip the spindle and rotate it when the armature moves in one direction, a second and fixed clutch member accommodated in the other recess adapted to grip the spindle to prevent its rotation in the opposite direction, spring means to control the oscillation of the armature system, means to vary the tension of the spring means and contact making and breaking means connected in the electro-magnet circuit.

Dated this 6th day of Jan., 1928.

ROBERT CONSTANTINE GRASEBY.